United States Patent
Proctor et al.

(10) Patent No.: US 6,700,885 B1
(45) Date of Patent: Mar. 2, 2004

(54) TELECOMMUNICATIONS SYSTEM

(75) Inventors: Richard J Proctor, Wimborne (GB); Thomas S Madden, Wimborne (GB)

(73) Assignee: Marconi Communications Limited, Coventry (GB)

(*) Notice: Subject to any disclaimer, the term of this patent is extended or adjusted under 35 U.S.C. 154(b) by 0 days.

(21) Appl. No.: 09/249,762

(22) Filed: Feb. 16, 1999

(30) Foreign Application Priority Data

Feb. 16, 1998 (GB) .............................................. 9803186
Apr. 1, 1998 (GB) .............................................. 9806862

(51) Int. Cl.[7] .............................................. H04L 12/56
(52) U.S. Cl. .................................. 370/356; 370/395.1
(58) Field of Search ................................. 370/258, 385, 370/389, 395, 396, 397, 400–406, 465, 466, 474, 522, 535, 236, 410, 495, 498, 905, 907, 229, 230–235, 503, 351, 352, 468, 395.1, 399, 395.21, 395.03, 395.31, 395.4, 395.43, 395.5, 395.52, 395.6, 395.61, 395.64, 395.65; 379/219, 220, 225, 226, 230–235, 242

(56) References Cited

U.S. PATENT DOCUMENTS

| | | | | |
|---|---|---|---|---|
| 5,729,548 A | * | 3/1998 | Holender ..................... | 370/474 |
| 5,734,653 A | * | 3/1998 | Hiraiwa et al. .............. | 370/474 |
| 6,137,800 A | * | 10/2000 | Wiley et al. ................. | 370/258 |
| 6,195,714 B1 | * | 2/2001 | Li et al. ..................... | 370/466 |
| 6,314,102 B1 | * | 11/2001 | Czerwiec et al. ........ | 370/395.6 |

FOREIGN PATENT DOCUMENTS

| | | |
|---|---|---|
| EP | 0 840530 A2 | 10/1996 |
| GB | 2 274 227 A | 7/1994 |
| GB | 2 316 573 A | 2/1998 |
| WO | WO 91/15066 | 10/1991 |

* cited by examiner

Primary Examiner—Dang Ton
(74) Attorney, Agent, or Firm—Kirschstein, et al.

(57) ABSTRACT

A telecommunications system comprising one or more cross-connects and a plurality of telephone exchanges. Two or more of the telephone exchanges are arranged to communicate with each other via the one or more cross-connects. An adapter provides the telephone exchanges with inter-communication via the one or more cross-connects. The adapter converts traffic between packetized and non-packetized form.

9 Claims, 6 Drawing Sheets

TELECOMMUNICATIONS SYSTEM

BACKGROUND OF THE INVENTION

The present invention relates to telecommunications systems such as telephone networks comprising a plurality of interconnected telephone exchanges and communication there-between.

Conventional telephone networks are fully-meshed in that each trunk exchange has a direct connection to every other trunk exchange. Traffic levels in telephone networks are increasing, leading to a continued need to increase the capacity of such networks. To achieve this, exchanges need to be enlarged and new exchanges installed. In fully-meshed networks, a significant number of additional network interconnections are needed with each new exchange, leading to further increases in the number of ports needed per exchange. This results in less efficient networks with costs per unit of traffic increasing.

By using the present invention it is possible to provide a more efficient and more easily configurable network.

SUMMARY OF THE INVENTION

The present invention provides a telecommunications system comprising one or more cross-connects and a plurality of telephone exchanges wherein two or more of the telephone exchanges are arranged to communicate with each other via the one or more cross-connects.

In a preferred embodiment the invention provides a telecommunications system wherein communication via the one or more cross-connects uses asynchronous transfer mode (ATM).

In a further embodiment the present invention provides a telecommunications system wherein the communication uses ATM Virtual Paths (VPs) and/or ATM Virtual Circuits.

The present invention also provides an adapter for providing the above telephone exchanges with a means of inter-communication of traffic via the one or more cross-connects wherein the adapter comprises means for converting the traffic between packetized and non-packetized form.

BRIEF DESCRIPTION OF THE DRAWINGS

Embodiments of the invention will now be described by way of example with reference to the drawings in which.

DETAILED DESCRIPTION OF THE INVENTION

Figure 1:
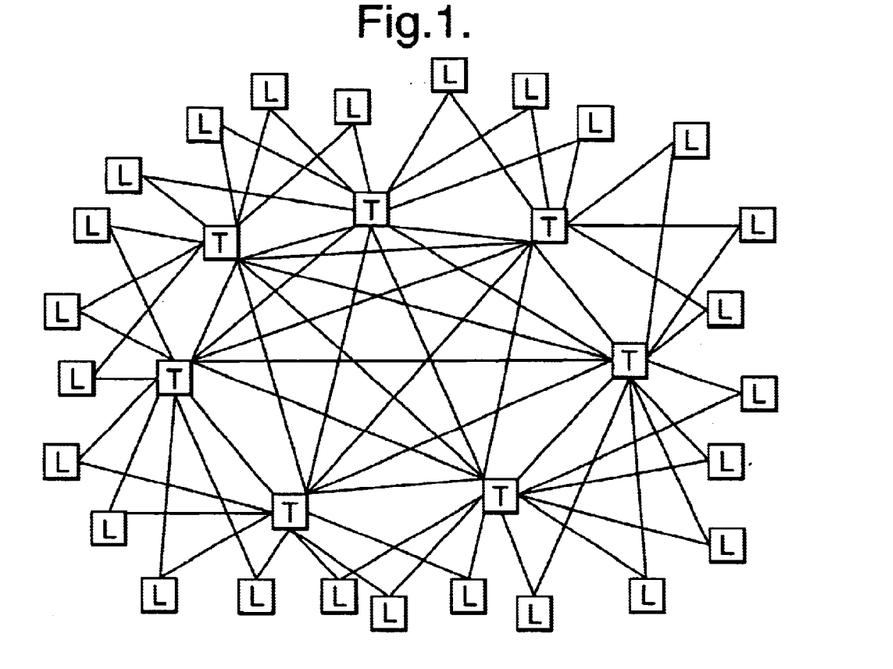
FIG. 1 shows in block diagram form a typical, conventional, large telecommunications network of the prior art.

Turning to FIG. 1 a typical, conventional, large telephone network comprises a number of local exchanges L interconnected via trunk exchanges T. Each local exchange L is connected to two (or more) trunk exchanges T, which are fully-meshed. In current networks this fully-meshed trunk interconnect typically uses mainly PDH transmission.

Figure 2:
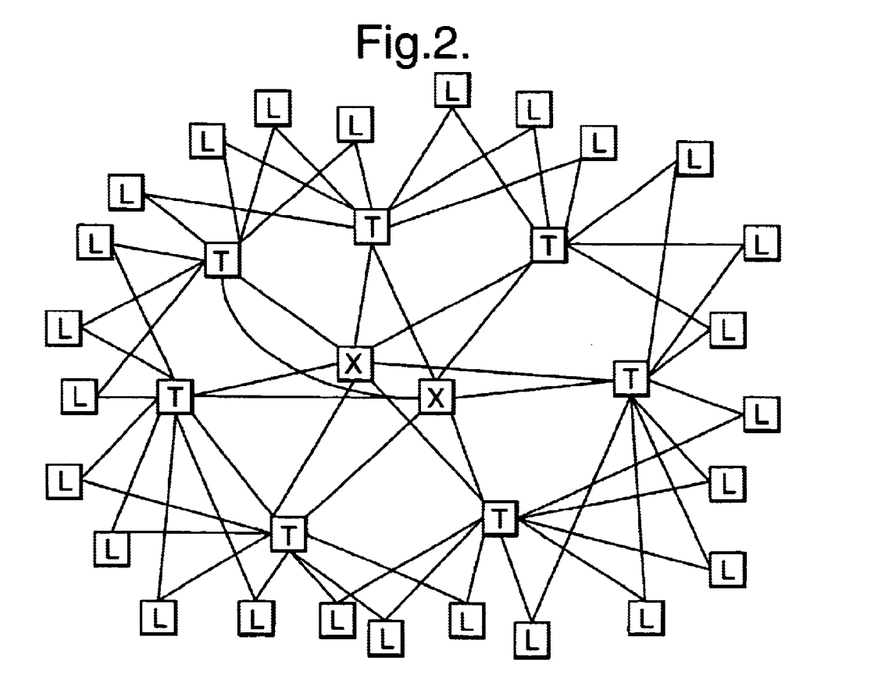
FIG. 2 shows the network of FIG. 1 with cross-connects according to a first embodiment of the invention.

FIG. 2 shows the typical, large network of FIG. 1 after trunk upgrade according to the invention. In this embodiment two cross-connects X are shown, although the number may vary in practice. Each cross-connect X is connected to every trunk exchange T. Rather than a large number of low bandwidth connections, the trunk interconnect now consists of few high bandwidth connections.

Figure 3:
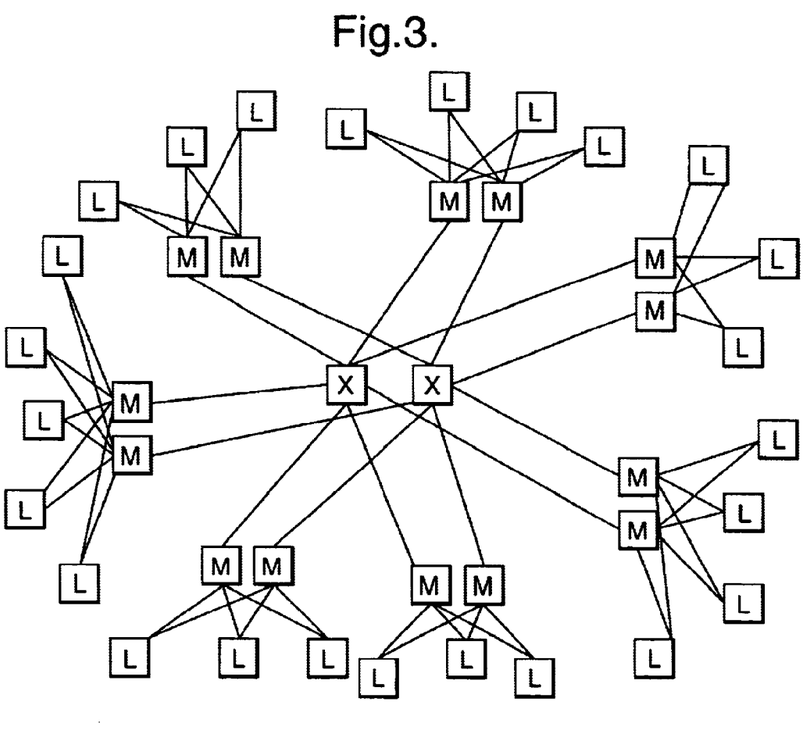
FIG. 3 shows the network of FIG. 2 with cross-connects according to a second embodiment of the invention.

FIG. 3 shows the typical, large network after local upgrade. With the addition of some simple multiplexers M, all the local exchanges are directly connected to the cross-connects X. The trunk exchanges (not shown) may still be used to provide regional interconnect and interconnection to non-upgraded exchanges and other networks.

Figure 4:
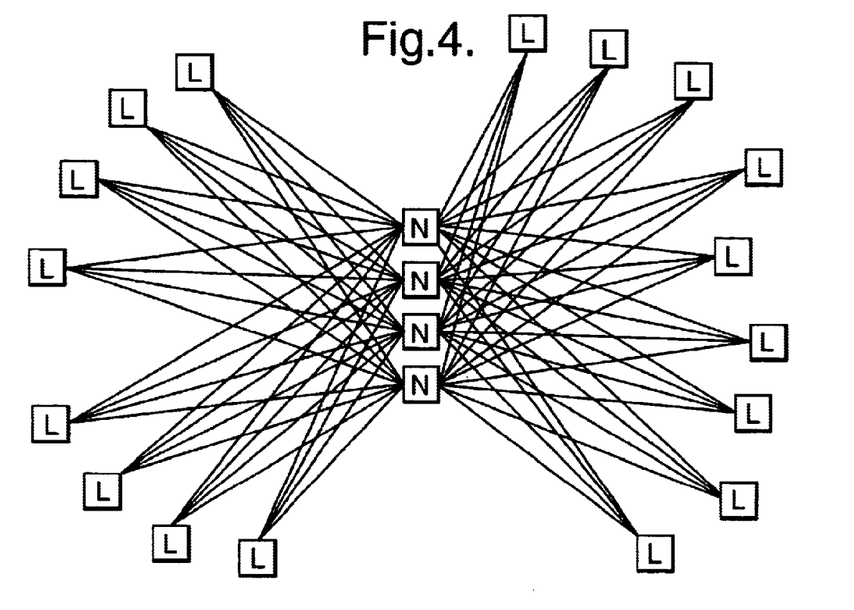
FIG. 4 shows in block diagram form a typical, conventional, small telecommunications network of the prior art.

FIG. 4 shows a typical, smaller network. The smaller network has tandems N rather than trunk exchanges, which may have a few customers directly connected. Each local exchange L is connected to several (possibly all) tandems N, there is no interconnection of the tandems.

Figure 5:
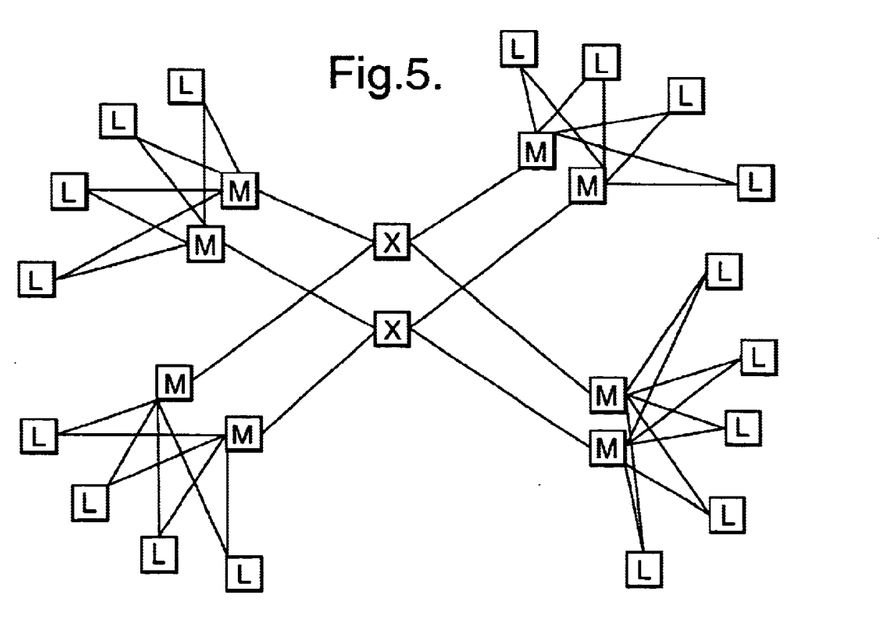
FIG. 5 shows the network of FIG. 4 with cross-connects according to a third embodiment of the invention.

FIG. 5 shows the typical, smaller network of FIG. 4 after being upgraded according to the invention. Cross-connects X are installed, similar to those used to upgrade the large network, interconnecting the local exchanges L, through multiplexers M. The old tandems can then be reused, for example, as local exchange and points of interconnect to other networks.

Figure 6:
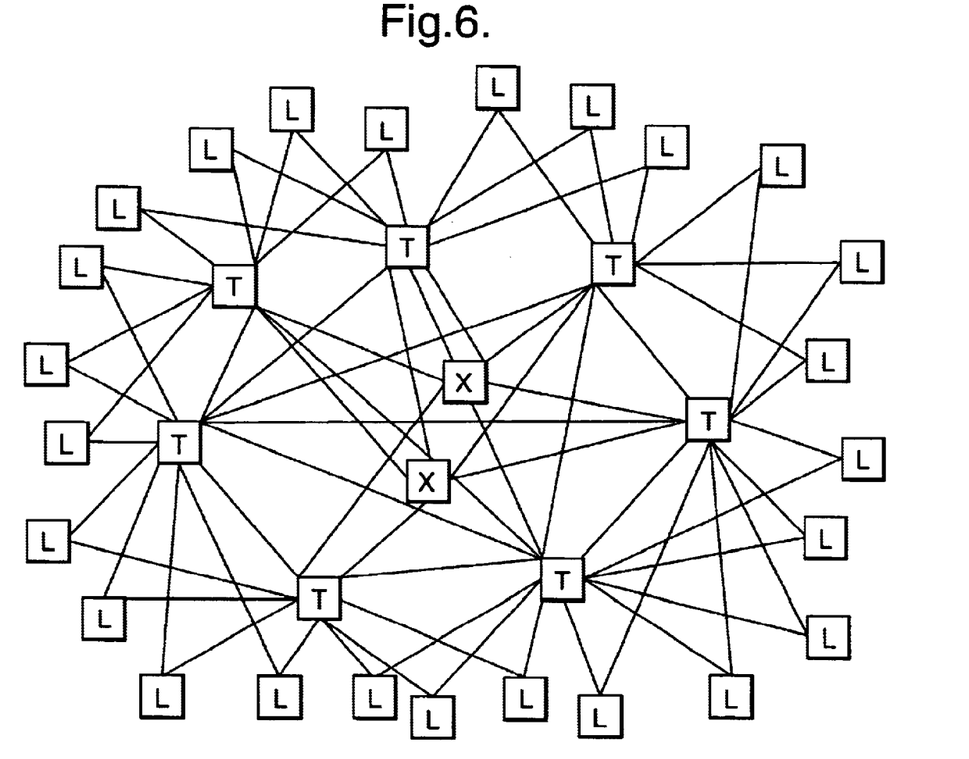
FIG. 6 shows the network of FIG. 1 partially upgraded with cross-connects according to the first embodiment of the invention.

The cross-connects X can be installed as a trunk network replacement piecemeal. FIG. 6 shows the large network of FIG. 1 partially upgraded. Here traffic is carried by a mixture of the old trunk interconnect and new cross-connects X. A number of trunk exchanges T have connection to the cross-connects X and are able to communicate with others so connected via the cross-connects. However not all trunk exchanges T are connected to the cross-connects X at this stage and the old trunk interconnect is still used for communication between exchanges not connected to the cross-connects X and for communication from each such exchange and each of the exchanges connected to the cross-connects X. The number of cross-connects X can be upgraded from one to four or more as further exchanges are connected.

In this way the cross-connects may be extended to eventually connect all existing trunk exchanges.

It may be desirable to move some of the existing transmission over to the cross-connects network, to take advantage of the greater efficiency of the cross-connects X compared with the existing meshed PDH, and to overcome a shortage of physical ports on the conventional switches.

Each exchange requires routing data containing information on the way the exchanges are interconnected within the telecommunications system. Every time an exchange gets connected to the cross-connects X, all the other exchanges that have already been connected to the cross-connects will need to have new routes set up for communication with the newly connected exchange. Reconfiguring exchanges in this way every time another exchange is connected via the cross-connects is expensive. A preferred solution is for routing data relating to all exchanges to be loaded into each exchange as it is connected to the cross-connects, but only to enable data relating to routes to those exchanges that have already been so connected.

Hence the implementation of the present invention simplifies the data requirements in exchanges. On installation, every exchange (trunk or local) can have exactly the same network data loaded. This data can be pre-prepared for the whole network with the data for the exchanges connected to the cross-connect being enabled as the network is enhanced. This data includes the network part of the digit decode, which is needed to determine the exchange to handle the call, and the route to be used. The same route number can be used for all exchanges to get to the same far-end exchange. The digit decode requirements of the exchanges would grow to support routing to all local exchanges.

The existing trunk exchanges, could still be used, e.g. as regional trunk exchanges (DJSUs), allowing reduction or elimination of sideways routes between local exchanges. If at any time these regional trunk exchanges are overloaded, the traffic can be handled in the main trunk (cross-connect) network.

Extension of the cross-connects to directly interconnect local exchanges may be implemented once there is a sufficiently developed provision of trunk cross-connect to provide the interworking.

The cross-connects themselves can be relatively simple ATM connections.

When expanded to connect the local exchanges, enhancement may be necessary to carry the signalling directly over the ATM connections. One way of interworking to local exchanges and other networks is to have simple interworking cross-connects, which are effectively minimalist exchanges. These could be the existing trunk exchanges.

The proposed solution supports carrying voice as AAL1 or AAL2 in configurations to suit different networks at different stages of evolution.

Telephone calls include traditional hand-set to hand-set calls but also calls initiated or answered by machine including computers. Such calls may contain voice and/or data from e.g. modems or facsimile equipment. Handling of such calls include call set-up, routing and clear-down. No call handling is required in the central cross-connects. All the call handling is handled in the PSTN, using existing protocols with all the existing features.

In a preferred embodiment of the present invention, each trunk/local exchange has an STM1 (155M) connection to each cross-connect, carrying one Virtual Path (VP) per destination exchange. For most local exchanges these 155M connections can be shared between several exchanges, as detailed below. The VP can grow or shrink as necessary: the total quantity of traffic is only limited by the capacity of the transmission to carry it. As traffic patterns change, VPs may grow or shrink on a dynamic basis: no configuration is necessary. Furthermore Virtual Circuits (VCs) may be used in a similar way.

The ATM implementation is capable of carrying some non-voice traffic but great care is necessary to ensure that it does not affect the low delay requirements of the trunk voice traffic.

The exchanges communicate using existing SS7 protocols, however there is an option (that is necessary when it is extended to local exchanges) to carry the MTP layer 3 over the Signalling ATM Adaptation Layer (SAAL) on the VP that connects each exchange, thus eliminating the need for any other signalling hardware.

Further bandwidth savings may be achieved if only active circuits are packetized. This requires a busy/idle timeslot map to be carried in an end to end control channel using spare capacity within the ATM Adaptation Layer. This technique allows the mapping to be changed dynamically and is set out in detail in patent number GB 2276518 in the name of GPT Limited.

Optional echo cancellation may be provided but will probably only be required for the single circuit mode.

Optional signalling transfer point (STP) function to handle SS7 signalling may be provided. This feature will extract redundant data (Level 2 underframe fill) from the SS7 signalling stream.

Optional modem (fax) detection may be provided. Low speed modems are not bandwidth efficient. In particular, many connections, e.g. fax calls, are essentially unidirectional. This optional feature will detect such calls and convert the modem signals to baseband data for packetisation into ATM, taking advantage of the fact that an ATM connection can be asymmetric. Thus further bandwidth savings can be achieved.

Although this has been described in relation to improve trunk networks, the present invention could also be deployed into many other fields for both public and private networks.

Similarly the present invention has application to leased lines within public networks. Leased lines are often under-utilized, resulting in idle timeslots being carried across the network. The use of the present invention, particularly for introducing communication via ATM VPs will allow the network operator to only transport the active channels without degrading the service presented to the end user.

The present invention provides for straightforward enhancement to support traffic growth wherein the majority of the routing data needed by most exchanges is identical. This allows operators to add to and evolve current networks as and when enhancements to performance or capacity are required.

Additional transmission equipment will be required to bring the STM1s from each local exchange to each cross-connect. Some ATM Multiplexer Add drop (AMAs) may be needed to consolidate the traffic from smaller local exchanges to connect to the cross-connects, depending on the exact location of exchanges and where the transmission runs. For interfacing with sources of non-packetised traffic an adapter is provided, see FIG. 7. The adapter functions to convert traffic for sending to the cross-connects into packets and to re-convert packets received from the cross-connects to un-packetised form. In one embodiment the adapter provides interworking between a PSTN trunk (G.703/G.704) and an ATM domain to allow ATM to be used to provide an efficient and flexible interconnect between exchanges by using variable bandwidth (ATM) routes.

Figure 7:
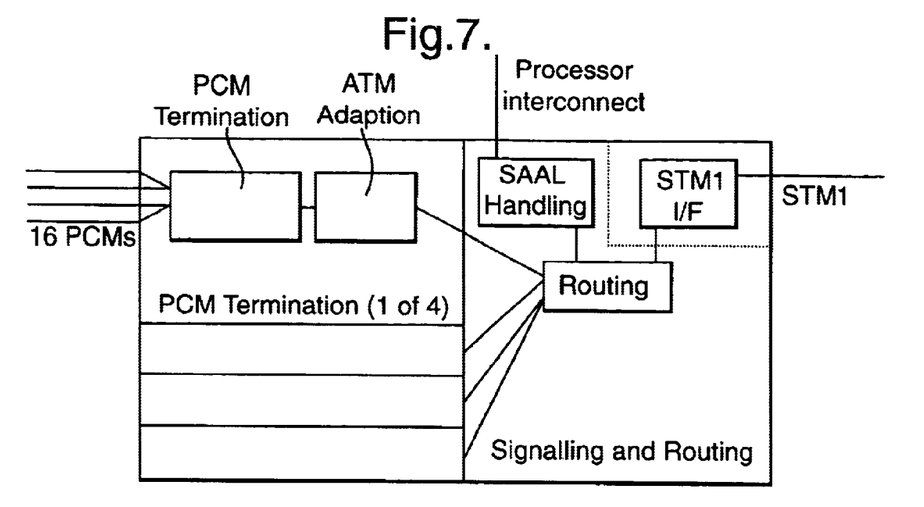
FIG. 7 shows in block diagram form an adapter according to the present invention.

For interfacing with STM networks, the adapter provides interworking between ATM and STM, with preferably one adapter for each route via the cross-connects. These adapters perform interworking between 2M bit/s PCM traffic and ATM and also provide a means to connect signalling directly with each of the other local exchanges. These boxes communicate with each of the processor clusters as most of the signalling traffic passes through them.

The adapter box can preferably be programmed for different types of adaptation to allow for various ATM adaptation methods, and any other special handling.

Figure 8:
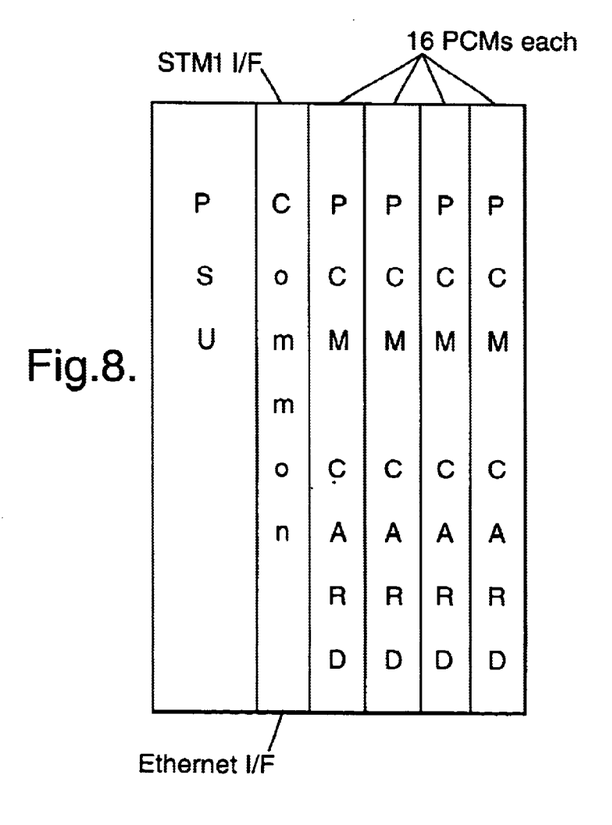
FIG. 8 shows a possible internal organization of the adapter of FIG. 7.

We now consider the adapter construction in more detail. Referring to FIG. 8, each adapter unit comprises a housing with a PSU, a common card and up to 4 PCM cards. Each PCM card could handle up to 16 PCMs, the common card has an STM1 interface, an Ethernet interface and a controller for the PCM cards. Each exchange will need 4 adapters in this embodiment and these could preferably all be mounted within one shelf of the exchange. If provision is made for T1 rates (as well as E1 rates) backplane provision for a fifth PCM card may be desirable.

The cross-connects operate under PSTN control and provide no control processing themselves. Advantageously a small number of cross links are provided between the main cross-connects, to provide some flexibility after major transmission network outages. These would only be brought into use when a pair of local exchanges have no common accessible trunk cross-connects (a very rare occurrence).

The routing function selects the single VC per VP that handles the signalling and routes that VC to the SAAL handler and thence to the processor interconnect. The rest of the traffic is routed to the appropriate PCM/Circuit handler. The SAAL handler might also, if required, handle some proprietary maintenance channels between the adapter units, for example to prevent potential overload when concentration of small local exchanges is provided.

The processor interconnect handles the signalling traffic, the mapping messages from CPS and general management. A suitable interface to use here is Ethernet as it allows the interface to be fairly open for use on other platforms if necessary.

The hardware of the PCM termination could support both E1 and T1 or be dedicated to E1 data rates.

With known networks, it would be a waste of resources to connect all the small local exchanges directly to each of the four ATM cross-connects via full STM1 connections. By using AMAs to provide simple ATM concentration, a number of small local exchanges can be grouped together to share a single STM1 link to the ATM cross-connects.

Figure 9:
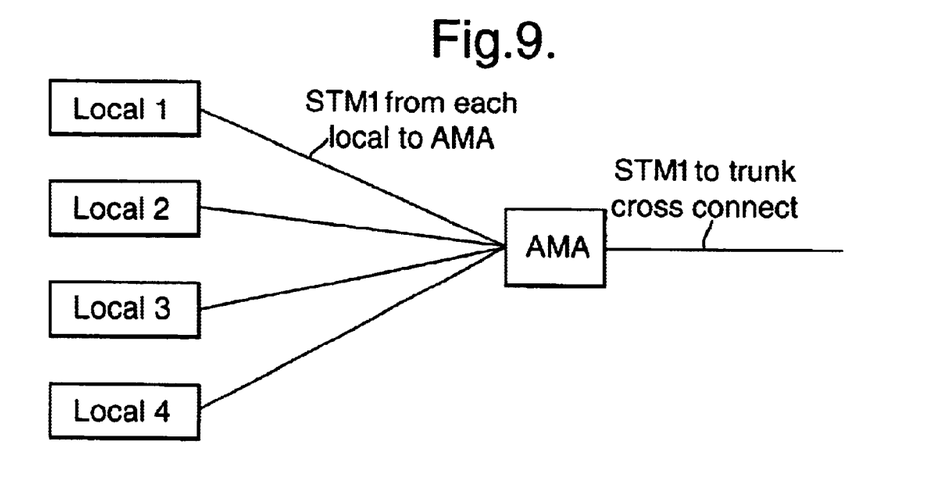
FIG. 9 shows in block diagram form the connection of local exchanges via an AMA.
Figure 10:
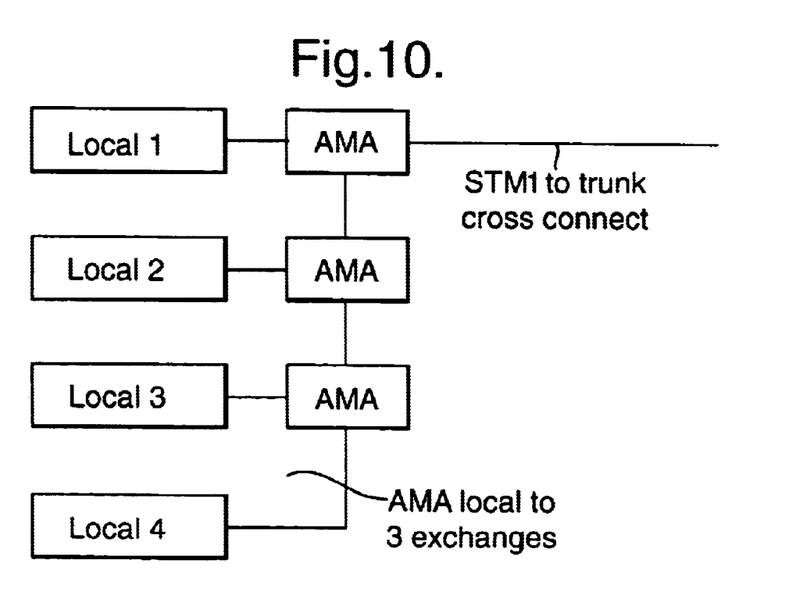
FIG. 10 shows in block diagram an alternative connection of local exchanges via AMAs.

A typical large network might require concentration of roughly 6 local exchanges onto one STM1. This concentration could be provided in two ways: at common points star connected local exchange could share a single ATM Multiplexer Add drop (AMA), or a small ATM switch (see FIG. 9); alternatively a number of local exchanges could be chained or connected in a ring by using a small number of smaller AMAs (see FIG. 10).

It is necessary to limit the traffic that such concentrated local exchanges would load onto the shared STM1 connection. This can be achieved whilst avoiding complex signalling as long as the network configuration limits the total number of PCMs connected to the adapter units in each of the local exchanges to 64. This could be ensured by the adapter units passing suitable messages between themselves.

This type of trunk network has the potential capacity to grow to be significantly larger than today's, without needing any significant changes. As the traffic grows, fewer local exchanges can be concentrated into multiplexers and more will need a direct connection to the ATM cross-connects. This leads to a need for larger ATM switch cross-connects and additional transmission. In the extreme, each local exchange could require many whole STM1s allocated to it without any concentration to the central ATM cross-connects. The number or size of the central ATM cross-connects needed to handle the increased traffic would increase accordingly.

The adapters also exchange status information with each other to ensure that each is operational and to exchange and pass on traffic-blocking information. Periodically and when necessary (for example because of a status change) each adapter should send a cell to each far end adapter. This cell contains three elements:

1. The adapter receiver status (i.e. whether the adapter is happy with what it is receiving from the far end adapters);
2. A hold indication that, if set, should cause the far end adapter to stop the flow of new traffic to that adapter;
3. Status information on the PCMs to the exchange (i.e. reflecting which PCM/circuits can be used).

When an adapter receives a check cell, it reacts as follows:

1. If the far is not happy, it should force clear all calls and hold that route busy (but still send its own check cells);
2. If the far end requests a hold, send a hold on the Q.50 to the associated exchange;
3. If the far end ceases to request a hold clear the condition (the adapter may delay reacting to a change of state to prevent the network oscillating);
4. If the far end has PCM failures, reflect these on to the alarm indication signal (AIS) of its transmitted PCMs.

The adapter also packetizes 64 kbit/s circuits into ATM cells in three modes:

single circuit AAL1 (6 ms delay);
multiple circuit AAL1 (about 250 microseconds delay for 20 circuits); and
multiple circuit AAL2 (about 250 microseconds delay for 20 circuits).

The 64K channels could be carried in many different ways, using AAL1, DBCES, AAL2 and in proprietary ways. They could be packaged as single channels or as N channels. The choice is based on a trade-off between delay and inefficiency due to unbalanced traffic. The adapter of the present invention can support all of these ways of carrying the 64K channels and allows changes as the network design evolves, for example starting as N channel packed, then moving to single channel packed, or perhaps AAL2.

To minimize the delay, at the expense of network utilization, N channels could be carried in one ATM Virtual Circuit, e.g. a whole PCM. This is most appropriate for trunk interconnects where the route sizes are large. Some compression may be achieved by removing unused channels. Capacity freed in this way could be used to support lower priority data traffic.

With this method of interconnecting local exchanges, the network efficiency is low with partially filled routes using a whole cell for one call and (N−1) other channels being wasted.

The ATM Forum specification for dynamic bandwidth circuit emulation service (DBCES) compresses out unused channels on N channel packetized ATM.

To maximize network utilization and simplify the signalling, at the expense of delay, the 64K channels could be carried in individual VCs. The main problem of this is delay as there would be nearly 6 ms packetization-delay to fill a cell. This would however result in a very simple and easy to understand network, both for traffic and data management.

Partially filled cells could be used to minimize the delay. It may only be necessary to partially fill a few cells for the longest routes, the rest being unaffected by the packetization delay. For deployment to the local exchanges, this method avoids very large wastage of network bandwidth resulting from the route sizes and traffic imbalance.

AAL2 has been designed to carry low rate, short length packets in delay sensitive applications in a bandwidth efficient way. The AAL2 multiplexes many separate low speed streams such as voice, data and signalling together on a single ATM VC. AAL2 has been standardized in ITU-T I.363.2. AAL2 is more efficient than sub-loaded ATM cells.

AAL2 could be used by the adapter to support trunk interconnect in a very similar way to the N channel packet defined above, though with increased delay. It would be very appropriate for environments where transcoding is handled and direct compression.

Voice traffic is given a high priority. This ensures that the delay variation would be well constrained, thus limiting the amount of additional buffering required to remove the effect of cell delay variation at the receiver.

The provision of the ATM infrastructure allows a simple migration of the signalling transport. Signalling messages are carried between the exchanges by encapsulating MTP L3 over the signalling AAL (SAAL) and then sending these between the exchanges. This would be faster and involve less equipment than conventional signalling methods.

Advantageously, all the signalling transport could be handled by the ATM network. Signalling using existing MTP L2 into the Digital Switching Subsystem (DSS) could be advantageously handled by the processing power of the adapter unit directly.

The Control protocol between the call processing and the adapter units is implemented as an application programming interface (API). This API covers the setting up and breaking down of switching associations, and optionally management (e.g. failure and configuration management).

Management of the adapter includes managing the equipment, configuring it and handling any appropriate statistics. Management is preferably achieved through the exchange or, when the adapter is being used as a standalone device, a Simple Network Management Protocol (SNMP) interface would be appropriate for it to be managed by third party management systems. Alternatively a standalone adapter could be managed through the Equipment Management Operations System (EMOS) particularly when they are closely associated with transmission. Thus, depending on where and how the adapter is being used, different management solutions are necessary. Within System X, the adapter could be considered as part of MTS. By treating it as part of MTS it will minimize the affect of the adapter on the rest of System X.

When the adapter is being used as standalone equipment, a SNMP management interface over the Ethernet control port will be appropriate. This will be controlled by a Managed Information Base (MIB) which should be published. The data model necessary for these applications may differ significantly depending upon the type of exchange used. Flexibility is essential to allow for the addition of functionality such as transcoding, packing algorithms and data rate change. When the adapter is deployed along with SDH transmission, it may be appropriate to manage it through EMOS and the rest of the SDH. This could be through the Ethernet port, through the DCC of the STM1, or through an ATM VC.

In principle all the traffic could be handled by a single cross-connect, but this is likely to be unacceptable in practice for availability reasons.

There will preferably be at least two cross-connects to allow for catastrophic failure. However even with two it will be necessary to have a very high level of redundancy with alternative routing for the transmission to these cross-connects. With four cross-connects there is a good level of built-in network redundancy, without the cost being too high. Each should preferably be dimensioned such that any two could handle the normal peak traffic loads of the entire network.

For maximum availability suitably diversely routed transmission should be arranged to the cross-connects with each cross-connect on an independent site.

The basic architecture would work with any of the following combinations:

Two cross-connects connected over two diverse routes and using transmission protection; three cross-connects over two diverse routes using transmission protection or three cross-connects with three diverse routes without transmission protection. Four cross-connects over two diverse routes without using transmission protection; four cross-connects over two diverse routes using transmission protection and six cross-connects connected via two to three diverse routes without transmission protection. Obviously the numbers above could be varied by the skilled worker depending on the requirements concerning resilience to failure and cost.

We claim:

1. A telecommunications system, comprising:
   a) one or more cross-connects;
   b) a plurality of telephone exchanges, wherein two or more of the telephone exchanges are arranged to communicate with each other via the one or more cross-connects;
   c) wherein each of the two or more of the telephone exchanges comprises routing data relating to communication with all other exchanges in the telecommunications system, and wherein the routing data is partially or wholly enabled; and
   d) wherein only that part of the routing data in a particular exchange relating to the communication between that particular exchange and other exchanges with which that particular exchange is arranged to communicate via the one or more cross-connects is enabled.

2. The telecommunications system of claim 1, wherein the communication via the one or more cross-connects is in the form of packets.

3. The telecommunications system of claim 2, wherein the communication via the one or more cross-connects uses asynchronous transfer mode (ATM).

4. The telecommunications system of claim 3, wherein the communication uses ATM Virtual Paths (VPs) and/or Virtual Circuits (VCs).

5. The telecommunications system of claim 4, wherein at least some of the telephone exchanges arranged to communicate with each other via the one or more cross-connects are trunk exchanges.

6. The telecommunications system of claim 5, wherein at least some other ones of the telephone exchanges arranged to communicate with each other via the one or more cross-connects are local exchanges.

7. The telecommunications system of claim 6, for handling telephone calls, wherein all call handling in the system takes place outside of the one or more cross-connects.

8. The telecommunications system of claim 7, wherein each of the trunk exchanges has a direct link to each of the one or more cross-connects.

9. The telecommunications system of claim 8, wherein the communication between the local exchanges and the trunk exchanges uses ATM.

* * * * *